US008990226B2

(12) United States Patent
    Park

(10) Patent No.: US 8,990,226 B2
(45) Date of Patent: Mar. 24, 2015

(54) METHOD AND APPARATUS FOR PROCESSING N SORT QUERIES IN MULTI-RANGE SCAN

(75) Inventor: Jun Hyun Park, Seongnam-si (KR)

(73) Assignee: NHN Corporation, Seongnam-si (KR)

( * ) Notice: Subject to any disclaimer, the term of this patent is extended or adjusted under 35 U.S.C. 154(b) by 252 days.

(21) Appl. No.: 13/474,382

(22) Filed: May 17, 2012

(65) Prior Publication Data

US 2012/0317128 A1    Dec. 13, 2012

(30) Foreign Application Priority Data

Jun. 7, 2011    (KR) .................. 10-2011-0054384

(51) Int. Cl.
    *G06F 17/30*    (2006.01)
(52) U.S. Cl.
    CPC .... *G06F 17/30471* (2013.01); *G06F 17/30386* (2013.01)
    USPC ......................................................... 707/752
(58) Field of Classification Search
    CPC .................. G06F 17/30386; G06F 17/30424; G06F 17/3053; G06F 17/30554; G06F 17/30979

USPC .................. 707/713, 723, 736, 748, 752, 769
See application file for complete search history.

(56) References Cited

U.S. PATENT DOCUMENTS

| 2004/0073646 | A1* | 4/2004 | Cho et al. .................. 709/223 |
| 2005/0076018 | A1* | 4/2005 | Neidecker-Lutz .............. 707/3 |
| 2006/0259457 | A1* | 11/2006 | Muras et al. .................. 707/2 |
| 2011/0202905 | A1* | 8/2011 | Mahajan ...................... 717/140 |

OTHER PUBLICATIONS

Jeff Atwood, SQL server—Parameterize a SQL IN clause, Mar. 12, 2008, Stack Overflow.*

* cited by examiner

*Primary Examiner* — Thu-Nguyet Le
(74) *Attorney, Agent, or Firm* — Greer Burns & Crain, Ltd.

(57) ABSTRACT

Disclosed is a method and an apparatus for optimally processing N sort queries in a multi-range scan, including: allocating a buffer based on a first number of extracted records included in the queries; extracting first data related to first attributes in a first list included in the queries and storing the extracted first data in the buffer; extracting second data related to the first attributes that are not extracted in the first list included in the queries; and updating the buffer so as to satisfy the queries by comparing the data stored in the buffer with the second data, wherein the queries are N sort queries in a multi-range scan for at least one record sorted based on the first attributes and second attributes.

20 Claims, 10 Drawing Sheets

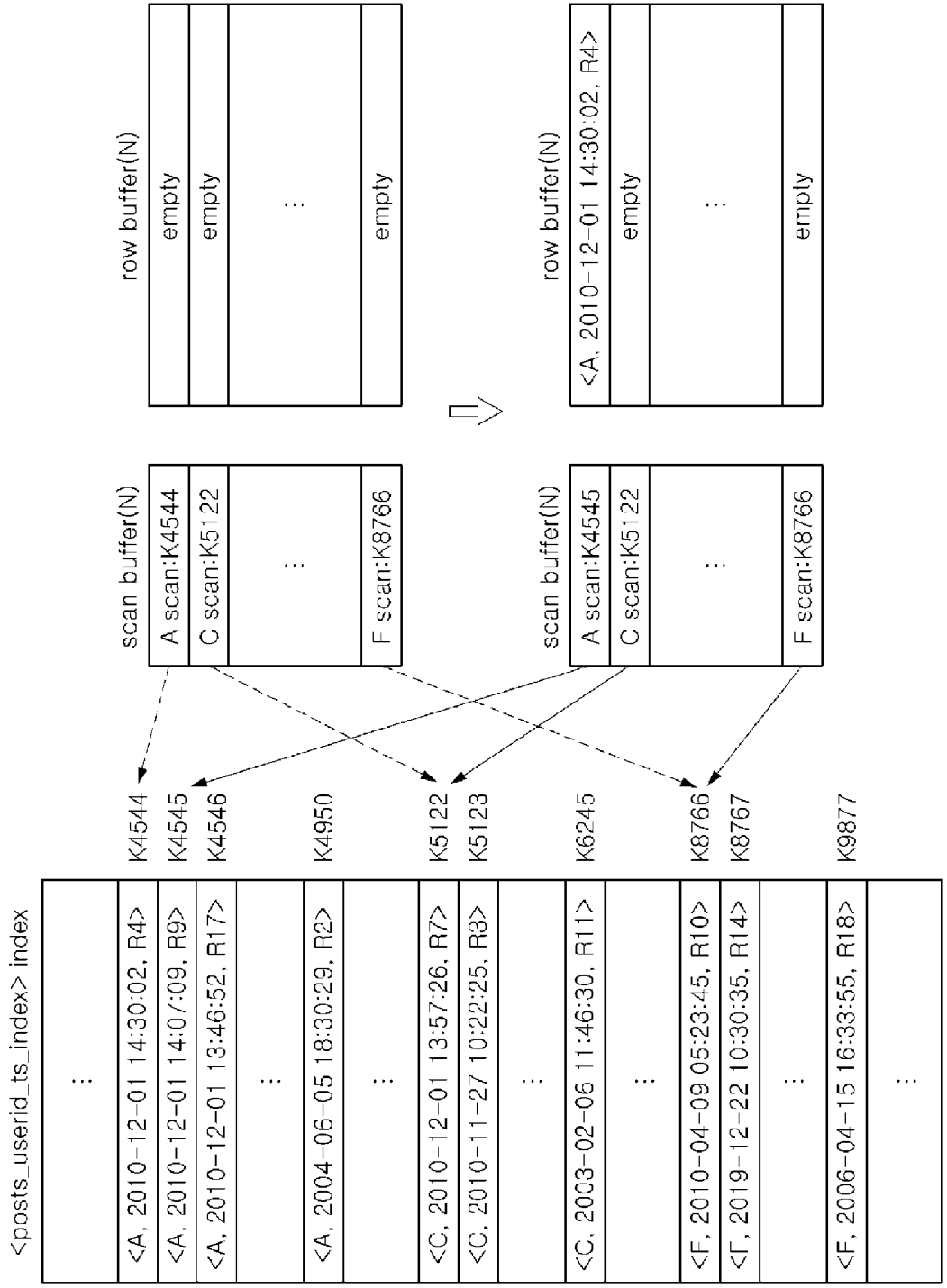

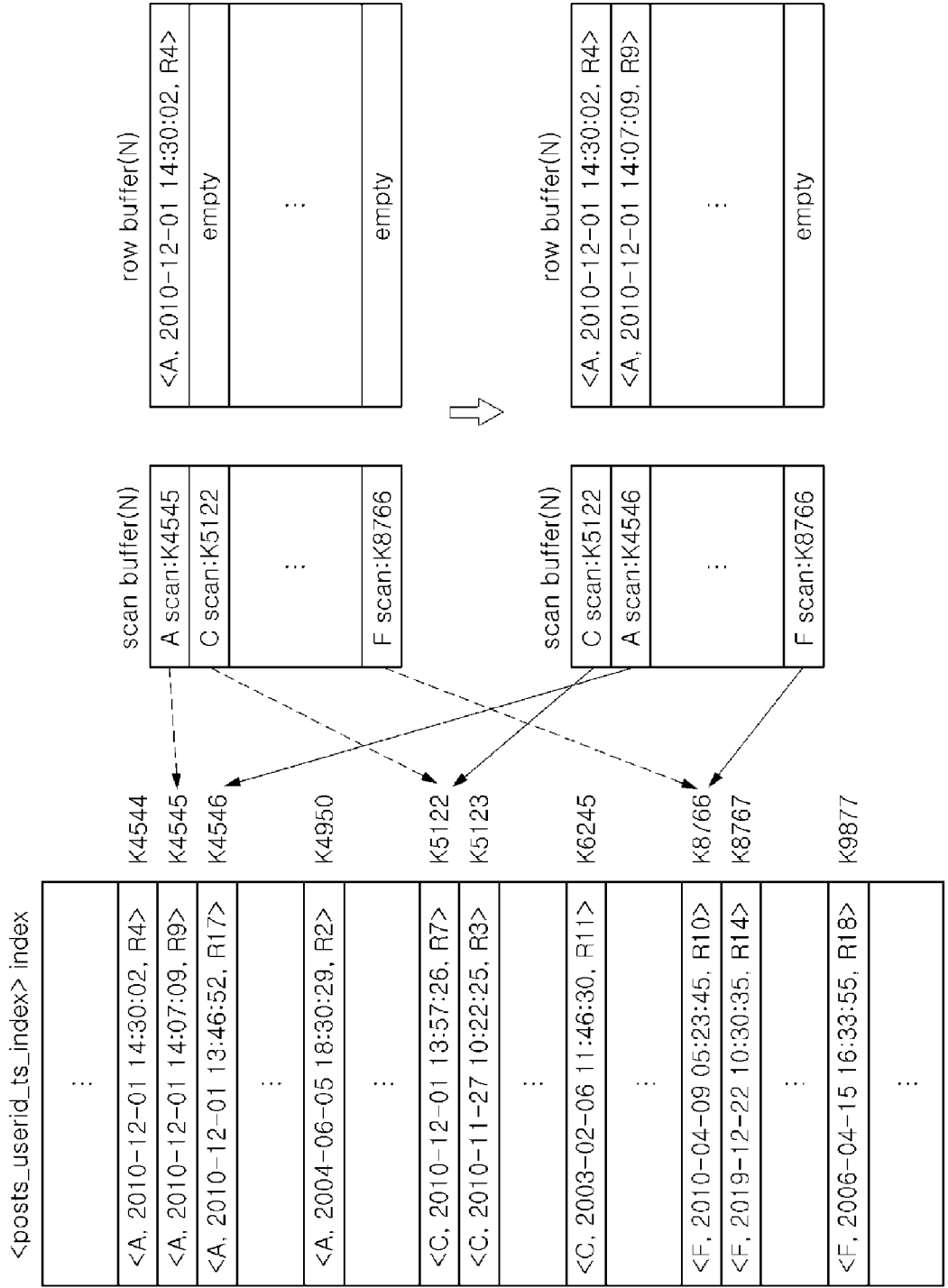

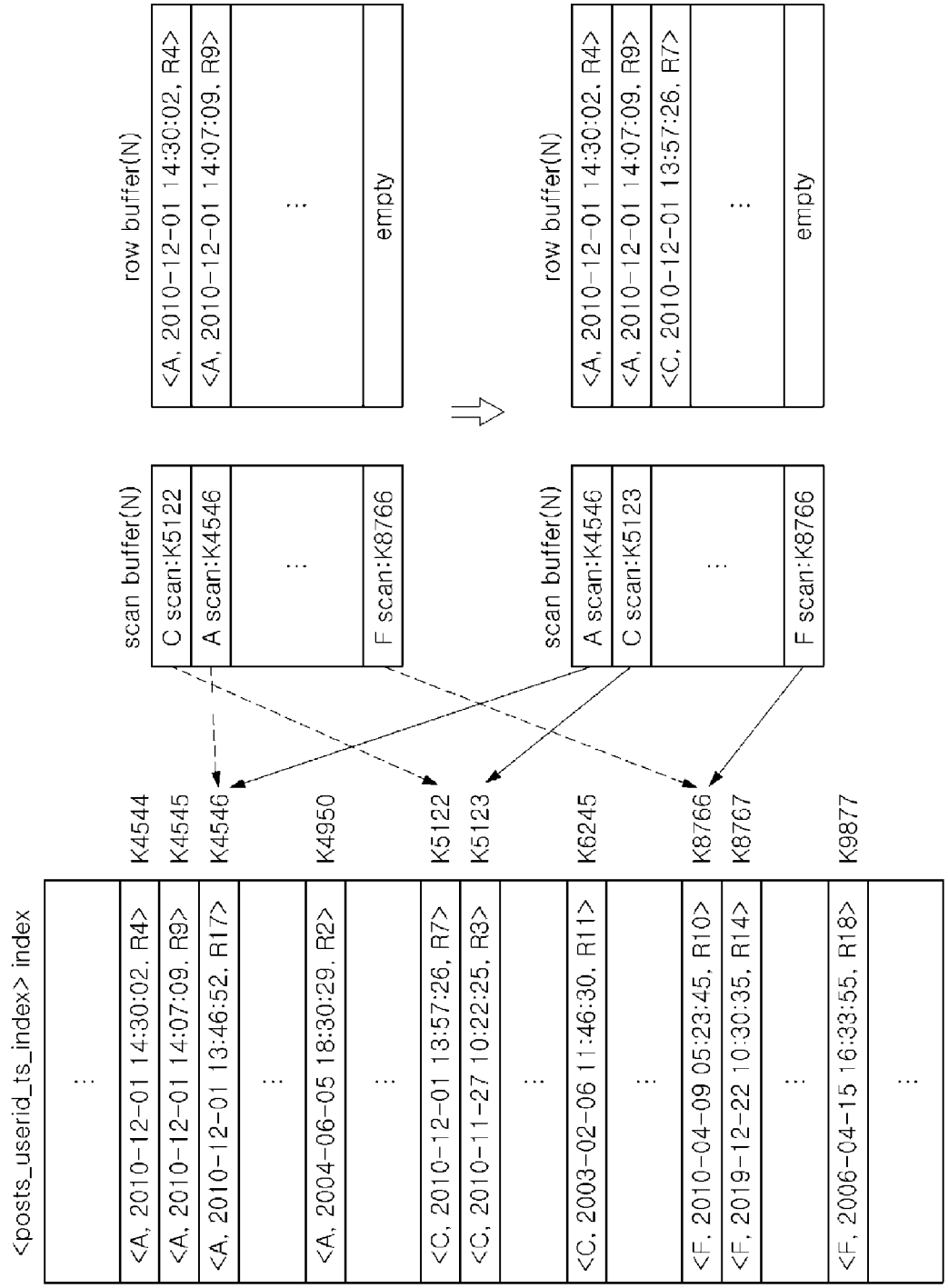

METHOD AND APPARATUS FOR PROCESSING N SORT QUERIES IN MULTI-RANGE SCAN

CROSS-REFERENCE TO RELATED APPLICATIONS

This application claims priority from and the benefit of Korean Patent Application No. 10-2011-0054384, filed on Jun. 7, 2011, which is hereby incorporated by reference for all purposes as if fully set forth herein.

BACKGROUND

1. Field

Exemplary embodiments of the present invention relate to a method and an apparatus for optimally processing N sort queries in a multi-range scan. Technologies specifically disclosed in this disclosure are applicable to a wide variety of data storage systems that provide a range scan function with an index as well as a database management system (hereinafter, referred to as "DBMS").

2. Discussion of the Background

With the development of the Internet, various social networking services (SNS) using the Internet have drawn attention. The SNS collectively means a service that can enhance online peer relations and allow new human relations with unidentified persons. Various types of SNSs with unique characteristics, such as CYWORLD™ of SK communications in Korea, FACEBOOK™ in U.S.A., and the like, have been constantly developed and served.

As an area of the SNS, Microblog has recently been used by many users. The "Microblog" is a type of a blog that uses a short message of one or two sentences to communicate with many people, which is referred to as a "miniblog." The Microblog allows real time update of information since users communicate with one another through short messages and can post pictures, moving pictures, or the like. That is, the Microblog may be a type in which blog is coupled with a messenger to allow users to feel as if they are using chatting programs. Further, since users create contents regarding their own trivial everyday lives, thoughts or feeling that come to their own minds at ordinary times, their own emotion, their own news, and the like, with a short message and communicate them with one another, they can conveniently use the Microblog without the burden of writing or reading long sentences. As a result, the Microblog has become greatly popular. A representative example of the Microblog may include TWITTER™, ME2DAY™ in Republic of Korea, and the like.

The SNS, in particular, the Microblog updates information in almost real time for the news that is exchanged across many users. Queries according to a scheme for allowing a user or other users (hereinafter, referred to as "friends," which may be at least several people or tens of thousands of people) that enter into a relation with the user to extract only a portion of the latest information among the communicated information and displaying the extracted information to the user or his/her friends have been frequently used. For example, queries of extracting a predetermined number (for example, N (N is a natural number)) of the most recently created messages that are created by friends or N messages created after a certain specific point of time have been frequently used. The processing of the queries needs to be performed in a multi-range scan type which repeatedly performs the operation of range-scanning only the messages created by the friends after the specific point of time for all the friends. The processing of the queries thus needs to perform the operation of extracting (hereinafter, the queries used for the extraction are referred to as 'N sort queries') in a sorted order only the most recently created N messages or after some time among the friends' messages that are accessed through the multi-range scan. However, most of the data storage systems including a DBMS according to the related art does not consider the optimal processing on the N sort query in the multi-range scan that has been mainly used in the SNS, or the like. For example, all the messages of friends that are accessed through the multi-range scan in the conventional DBMS are extracted as interim results and then, these messages need to be sorted in a reverse order of creation time. Therefore, the processing speed may be very slow and a huge storage space for storing the interim results may be needed. Accordingly, the queries frequently performed in the SNS, or the like, may not be efficiently processed only by the function of the conventional DBMS.

The processing scheme according to the related art may exponentially increase all the number of records to be scanned by the DBMS as the number of messages created for each user is increased and as the number of friends is increased. In this case, a considerable amount of memory space for storing an intermediate record set required for sorting is needed and a burden of sorting a large number of records is increased, which leads to an increase in a waste of time and space consumed to process queries.

Therefore, when receiving the N sort queries in the multi-range scan frequently used in the SNS, or the like, a need exists for a scheme for performing the corresponding query processing by using only the storage space having a limited size while minimizing the number of messages of friends to be scanned, that is, a scheme for processing an optimal query in terms of temporal and spatial costs.

Further, the scheme for processing queries is required for a high-rate data repository that provides a range scan function in the existing DBMS and a front stage of the DBMS, that is, a high-rate data repository that provides the range scan with an index for collection of data while storing and managing data only in the memory. For example, the high-rate data repository is included in a type of a database that is focused on processing performance or system scalability while providing a new interface, rather than in a NoSQL database that has been mainly discussed in a recent database, that is, the DBMS that provides the query processing function through an SQL interface.

The above information disclosed in this Background section is only for enhancement of understanding of the background of the invention and therefore it may contain information that does not form any part of the prior art nor what the prior art may suggest to a person or ordinary skill in the art.

SUMMARY

Exemplary embodiments of the present invention are directed to using only a small memory space while minimizing time consumed to process queries by directly obtaining sorted results during a scan process while minimizing the number of records to be scanned, when receiving N sort queries in a multi-range scan.

Exemplary embodiments of the present invention are also directed to maximizing query processing performance at the time of providing services, such as SNS, or the like, by implementing a query processing technology in a DBMS or a high-speed data repository and in an environment where N sort queries may be mainly used in a multi-range scan, such as SNS, or the like.

Exemplary embodiments of the present invention are directed to providing a scheme for internally processing N sort queries in a multi-range scan for each DBMS so that a developer may efficiently process queries in a DBMS according to the related art and to process the N sort queries by an optimal scheme even though the conventional queries are used as they are without needing to correct the queries to be optimized for each DBMS, thereby promoting convenience and improvement in a development speed in designing and developing SNS, or the like.

Additional features of the invention will be set forth in the description which follows, and in part will be apparent from the description, or may be learned by practice of the invention.

An exemplary embodiment of the present invention discloses a method that uses a processor for processing N sort queries in multi-range scan, the method including: allocating a buffer based on a first number of extracted records included in the queries; extracting, using the processor, first data related to first attributes in a first list included in the queries and storing the extracted first data in the buffer; extracting, using the processor, second data related to the first attributes that are not extracted in the first list included in the queries; and updating the buffer so as to satisfy the queries by comparing the data stored in the buffer with the second data, wherein the queries are N sort queries in a multi-range scan for at least one record sorted based on the first attributes and second attributes.

Another exemplary embodiment of the present invention discloses non-transitory computer-readable medium comprising an executable program which, when executed, performs a method including: allocating a buffer based on a first number of extracted records included in the queries; extracting first data related to first attributes in a first list included in the queries and storing the extracted first data in the buffer; extracting second data related to the first attributes that are not extracted in the first list included in the queries; and updating the buffer so as to satisfy the queries by comparing the data stored in the buffer with the second data, wherein the queries are N sort queries in a multi-range scan for at least one record sorted based on the first attributes and second attributes.

Another exemplary embodiment of the present invention discloses an apparatus for processing N sort queries in multi-range scan, the apparatus including: a buffer allocator to allocate a buffer based on a first number of extracted records included in the queries; and a scanner to extract first data related to first attributes in a first list included in the queries and to store the extracted first data in the buffer, to extract second data related to the first attributes that are not extracted in the first list included in the queries, and to update the buffer so as to satisfy the queries by comparing the data stored in the buffer with the second data, wherein the queries are N sort queries in a multi-range scan for at least one record sorted based on the first attributes and second attributes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 7A, FIG. 7B, FIG. 7C, and FIG. 7D are diagrams for describing a type of a scan buffer and a row buffer and a step of updating these buffers in the method of processing N sort queries in a multi-range scan according to the second exemplary embodiment of the present invention.

DETAILED DESCRIPTION OF THE ILLUSTRATED EMBODIMENTS

Figure 1:
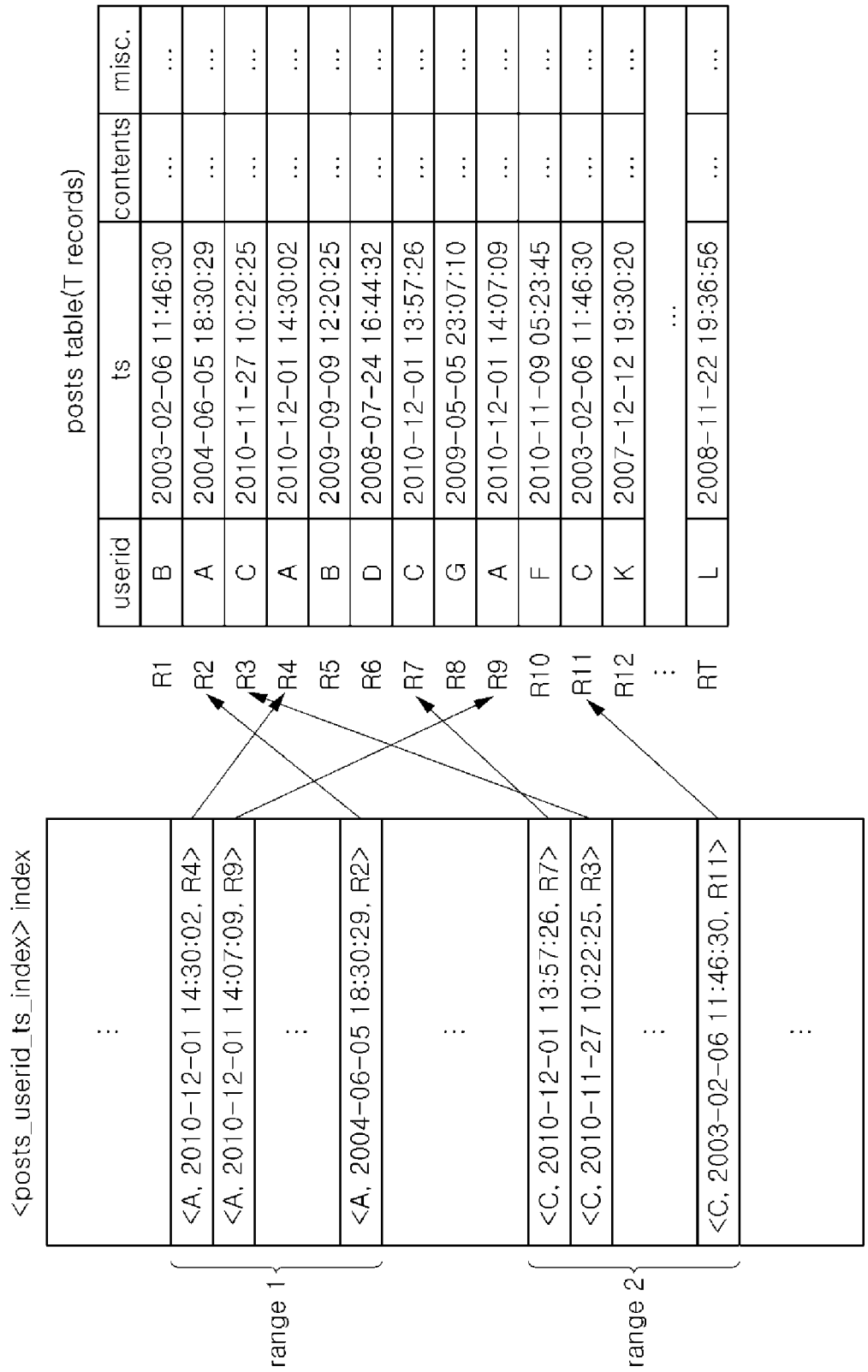
FIG. 1 is a diagram showing a plurality of ranges to be scanned with an index when a DBMS according to an exemplary embodiment of the present invention processes N sort queries in a multi-range scan.

Embodiments of the present invention will be described in detail with reference to the accompanying drawings. These embodiments will be described in detail for those skilled in the art in order to practice the present invention. It should be appreciated that various embodiments of the present invention are different but do not have to be exclusive. For example, specific shapes, configurations, and characteristics described in an embodiment of the present invention may be implemented in another embodiment without departing from the spirit and the scope of the present invention. In addition, it should be understood that position and arrangement of individual components in each disclosed embodiment may be modified without departing from the spirit and the scope of the present invention. Therefore, a detailed description described below should not be construed as being restrictive. In addition, the scope of the present invention is defined only by the accompanying claims and their equivalents if appropriate. Similar reference numerals will be used to describe the same or similar functions throughout the accompanying drawing. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Hereinafter, exemplary embodiments of the present invention will be described in detail with reference to the accompanying drawings so that those skilled in the art may easily practice the present invention.

Exemplary Embodiments of the Invention

Scan Range at the Time of Processing Queries According to Exemplary Embodiments of the Invention FIG. 1 is a diagram showing a plurality of ranges to be scanned with an index when a DBMS according to an exemplary embodiment of the present invention processes N sort queries in a multi-range scan.

In a service or a system that uses N sort queries in a multi-range scan, a database that is a target of storing and searching messages generated by users may be implemented in various schemes, but may generally include a user ID who has created the messages, time stamps that indicate created-time information, contents of the created messages, and attributes on additional information. For convenience of explanation, exemplary embodiments of the present invention will be described based on the DBMS and a structured query language (SQL). The table "posts" (named for convenience of explanation) is illustrated below, wherein the userid represents the user ID, ts represents the time stamps, and contents represents the contents of the created messages in the DBMS.

TABLE 1

| Userid | Ts | Contents | Others |
|---|---|---|---|
| A | 2010-12-01 23:15:42 | At the periphery in recent . . . | |
| B | 2010-12-01 22:57:07 | Go Hom... | |
| . | . | | |
| . | . | | |

Meanwhile, in the "posts" table as shown in Table 1, the N sort queries in the multi-range scan extracting only a specific number of most recently created messages or the specific number of messages created after a certain specific point of time, from messages in connection with all the friends of any one user may be created in various schemes, but may generally be implemented as an exemplary SQL sentence below.

SELECT ts, userid
FROM posts
WHERE userid IN (friends_list) AND ts<sysdate( )
ORDER BY ts DESC
LIMIT N;

(where friends_list may include only the user ID list of friends of predetermined users and may include the user ID list of friends including the predetermined user, which may vary according to whether the messages of some users are collected in a specific service or system performing the corresponding queries. In addition, N means the number of messages to be extracted).

In order to efficiently process the SQL sentence, an index for quickly searching records in the user ID for the "posts" table or in a reverse order of the time stamps therein is needed. To this end, an index having a key of an ascending order for the userid and a descending order for the ts is generally created. It is assumed that the index is posts_userid_ts_index, for convenience of explanation.

Figure 6:
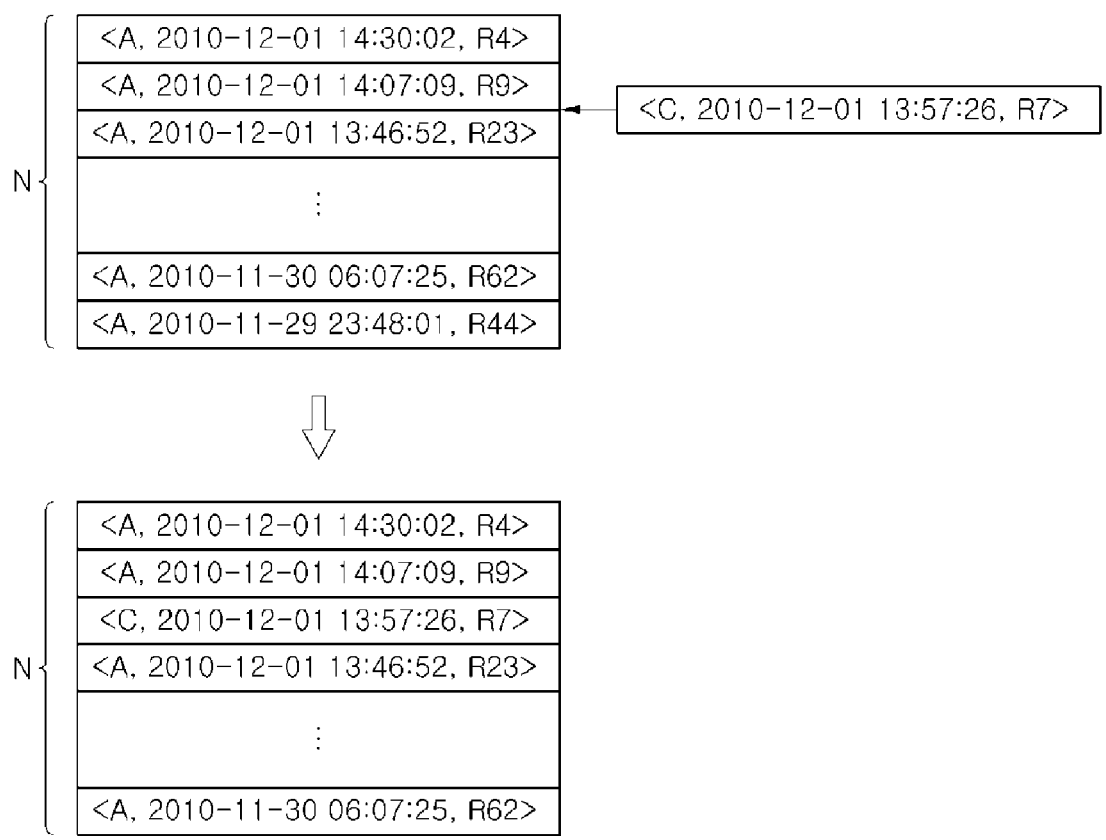
FIG. 6 is a diagram for describing a step of updating a row buffer in the method of processing N sort queries in the multi-range scan according to the first exemplary embodiment of the present invention.

The index has a single key corresponding to each record in the table, wherein the single key includes a key value and an identifier of the record having the key value. For example, in FIG. 1, a first key of range 1 has A and 2010-12-01 14:30:02 as a key value and R4 as an identifier of the record having the key value. Also, in the case of a main memory database DBMS (MMDBMS) which makes all the data reside in the memory, the record having the key value always resides in the memory, and thus, the key value may be directly accessed through the record identifier of the key. Therefore, the keys of the index in the MMDBMS generally is have only the record identifiers. Therefore, the keys in the index represented in FIG. 1 are represented under the assumption of a general disk DBMS having all of the key values and the record identifiers. To a person skilled in the art to which the present invention pertains, the key configuration in the index is not limited to one shown in FIG. 1 and therefore, it would be apparent that the key configuration in the index according to the implementation characteristics of the data repository may be modified. As shown in Table 1, in order to perform the SQL sentence from the "posts" table shown in the right side of FIG. 1 in which the records are stored in a random order, as shown in the left side of FIG. 1, it is assumed that the posts_userid_ts_index index associated with the "posts" table is provided. Referring to FIG. 6 and FIG. 7, the procedure for performing the N sort queries in the multi-range scan such as the SQL sentence according to the exemplary embodiments of the present invention will be described in more detail below based on the provided posts_userid_ts_index index.

Device According to Exemplary Embodiment of the Invention

Figure 2:
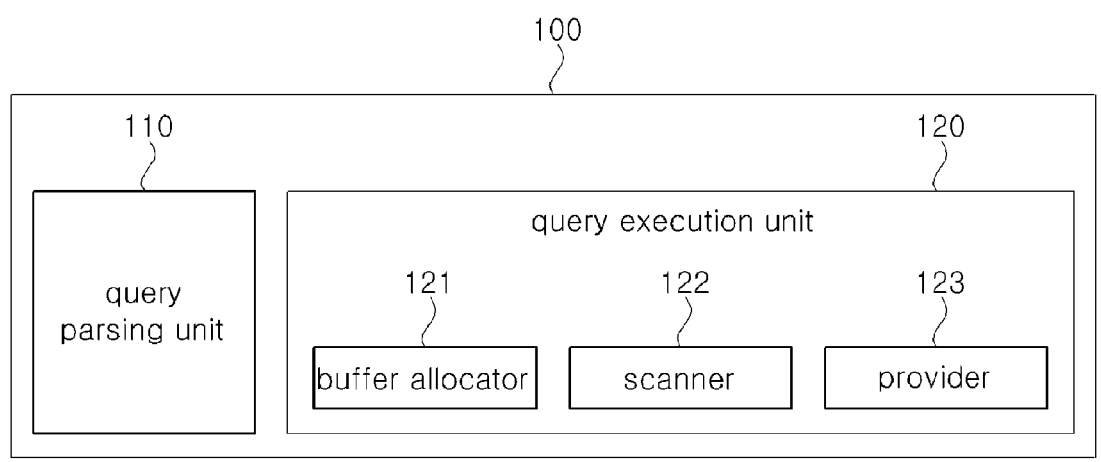
FIG. 2 is a detailed configuration diagram of an apparatus for processing queries that processes N sort queries in a multi-range scan according to a first exemplary embodiment and a second exemplary embodiment of the present invention.

FIG. 2 is a detailed configuration diagram of a query processing device that processes N sort queries in a multi-range scan according to a first exemplary embodiment and a second exemplary embodiment of the present invention.

Referring to FIG. 2, the query processing device 100 according to an exemplary embodiment of the present invention may be largely divided into a query parsing unit 110 and a query execution unit 120. The query execution unit 120 may include a buffer allocator 121, a scanner 122, and a provider 123.

The query parsing unit 110 according to the exemplary embodiment of the present invention receives queries in a specific format, and parses the received queries to determine whether the received queries are the N sort queries in the multi-range scan. Here, the "entity" that transmits the queries in the specific format to the query parsing unit 110 has a broad meaning that covers a device or a component that may access the query processing device 100 through communications with the query processing device 100 to request data. The query transmission for the query processing device 100 may be performed after checking in advance whether the transmission entity has valid authority to enable a request for specific data through the query to the query processing device 100 by a procedure such as authentication between the transmission entity and the query processing device 100. In such case, the authentication procedure may use a known authentication procedure as used at the time of accessing DBMS. The query in the specific format received by the query parsing unit 110 may be an SQL context, and the query parsing unit 110 may use a parsing function to determine whether the received query is the N sort query in the multi-range scan.

Rather than merely determining whether the queries are the N sort queries in the multi-range scan, the query parsing unit 110 according to the exemplary embodiment of the present invention may also include functions of parsing in detail the received queries and further parsing and extracting the information on the number of records to be extracted, the user IDs to be scanned, the time stamp values that are references of sorting, and the like.

The query execution unit 120 according to the exemplary embodiment of the present invention executes the queries based on the information that has been parsed by the query parsing unit 110. While the query execution unit 120 may have several components therein, in order to simplify the explanation of the scheme for efficiently processing the N sort queries in the multi-range scan, the query execution unit 120 will be explained as including the buffer allocator 121, the scanner 122, and the provider 123. First, the buffer allocator 121 according to the exemplary embodiment of the present invention allocates buffers, temporary storage spaces for scanning on the memory, if it is determined that the query received by the query parsing unit 110 is an N sort query in the multi-range scan. The size of each of the allocated buffers corresponds to the number of records to be extracted from the information parsed by the aforementioned query parsing unit 110. For example, when the number of records to be extracted is N, the buffer allocator 121 may allocate row buffers capable of handling N sort queries according to the scan scheme of the scanner 122, which will be described below, or N scan buffers and N row buffers. In this case, the row buffer means a memory region that may store the key values and the identifiers of the records to be extracted with the index scan, or store only the identifiers of the records. Furthermore, the scan buffer means a memory region that may store the identifier information of the index scans to scan the latest records among the index scans for several users. Next, the scanner 122 according to the exemplary embodiment of the present invention uses the limited number of buffers allocated by the buffer allocator 121, and performs the uppermost N sort queries in the multi-range scan parsed by the query parsing unit 110 through the minimum index scan. The detailed procedure for performing queries of the scanner 122 according to the exemplary embodiment of the present invention will be described below.

Finally, the provider 123 according to the exemplary embodiment of the present invention transmits the specific number of records stored in the row buffers allocated by the buffer allocator 121 to the specific entity requesting the queries as the result of the queries.

In FIG. 2, the query parsing unit 110, the buffer allocator 121, the scanner 122, and the provider 123 may be physically implemented within the single machine, or alternatively, a portion or each thereof may be physically implemented in a separate machine. Also, the components may be present in a plurality of machines physically performing the same functions in parallel. It would be apparent to those skilled in the art that the specific design of the exemplary embodiment of the present invention may be modified in various ways without being limited to the actual number and position of machines and databases in which each component is implemented.

In FIG. 2, only the components necessary to explain the exemplary embodiment of the present invention is disclosed and explained, and therefore, it would be apparent to those skilled in the art that each component performs other known functions that are not described in the exemplary embodiment of the present invention or a separate component for performing other known functions not shown in FIG. 2 may be further included in the query processing device 100.

Processing of N Sort Queries in Multi-Range Scan

Next, a method of processing N sort queries in a multi-range scan performed by the scanner 122 according to the exemplary embodiment of the present invention will be described with reference to FIG. 3, FIG. 4 and FIG. 5.

First, according to the exemplary embodiment of the present invention, it is assumed that the buffer allocator 121 allocates the row buffers corresponding to the number of records (hereinafter, referred to as 'N'). According to the first exemplary embodiment of the present invention shown in FIG. 3, the scanner 122 of the query processing device 100 starts the index scan for each user to search only the most recent messages or the messages after a specific point of time based on the previously assumed posts_userid_ts_index index (S110). The index scan downwardly searches the index from a root node to a leaf node, i.e., the lowest node, and searches a first record that satisfies the search conditions (S120). If it is determined that the first record that satisfies the search conditions has not been found (S130), no messages generated by the current user after the specific point of time exist and therefore, the current index scan ends (S190). If it is determined that the first record that satisfies the search conditions exists (S130), the scanner 122 performs an operation of storing the current record information in the row buffer as follows. That is, it is checked whether the N-sized row buffer is full (S140). If it is determined that the row buffer is not full (S140), the row buffer has a space to store the record information. Then, a position at which the record information will be inserted in the row buffer is searched by comparing the time stamp value of the currently searched record with the time stamp values of the records stored in the row buffer so as to maintain the reverse order of the time stamps. Therefore, the current record information is saved in the position (S170). By the scheme, the record information stored in the row buffer is always sorted in the reverse order of the time stamps. If it is determined that the row buffer is full (S140), it is checked whether the currently searched records may be inserted into the row buffer by comparing the time stamp value of the currently searched record with the time stamp value of the final record stored in the row buffer, that is, the records having the smallest time stamp values in the row buffer sorted in the reverse order of the time stamps (S150). If it is determined that all the time stamp value of the current record are smaller than or equal to the time stamp value of the final record (S150), the message generated by the current user is older than N messages corresponding to the record information previously generated by other users, that is, stored in the row buffer. As a result, there is no need to insert the record searched for the current user in the row buffer and therefore, there is no need to search the next record of the current user. Therefore, the operation of scanning the message of the current user stops (S190). If it is determined that the time stamp value of the current record is greater than the time stamp value of the final record present in the row buffer (S150), the final record is removed from the row buffer (S160) and the current record is inserted into the row buffer (S170). Even in such case, the record saved in the row buffer is maintained by searching an appropriate insertion position of the current record so as to maintain the sorting in the reverse order of the time stamps (S170). According to the first exemplary embodiment of the present invention, it can be appreciated from FIG. 6, which shows the updating of the row buffer according to insertion of a record into the row buffer, that the scanner 122 extracts the record generated by the user C from the row buffer in which the N records are stored in advance and inserts the extracted record into the row buffer. The time stamp of the record generated by user C and to be inserted is "2010-12-01 13:57:26" and is newer than "2010-11-29 23:48:01," the time stamp of the final record stored in the row buffer. Further, the record is not newer than the second time stamp, "2010-12-01 14:07:09", but newer than the third time stamp, "2010-12-01 13:46:52", and therefore, the time stamp needs to be positioned therebetween. Therefore, the scanner 122 removes the record (record having the identifier R44) at the final position of the row buffer and the current record is stored at a third position of the row buffer. Therefore, the records stored in the conventional row buffer from a third position to an N−1-th position are stored while moving back one by one according to the insertion of the records generated by user C. As a result, it can be appreciated that the final record stored in the row buffer after the insertion is a record having R62 as the same identifier as the existing record stored at the N−1-th position.

Referring again to FIG. 3, when the currently searched record is inserted into the row buffer, the next record is searched through the current index scan (S180) and the aforementioned processing is repeated according to whether the next record is present (S130).

If it is determined that the record to be scanned in the index scan for the current user is no longer present (S130) or the time stamp of the searched record is smaller than or equal to the minimum time stamp value of the records saved in the row buffer (S150), the scan for the current user is no longer performed and therefore, the index scan for the current user ends as described above (S190).

If it is determined that the scan for the current user has ended, it checks whether a next user is present (S200). If it is determined that the next user is present (S200), the index scan for the user starts (S110) to repeat the aforementioned processing. If it is determined that a next user does not exist any longer (S200), the records in the row buffer are the final query result (S210), and therefore, the whole process ends. In this case, the users mean friends that include the predetermined users or do not include the predetermined users according to the design or development characteristics of the service or the system using the queries to obtain the N sort results.

Figure 3:
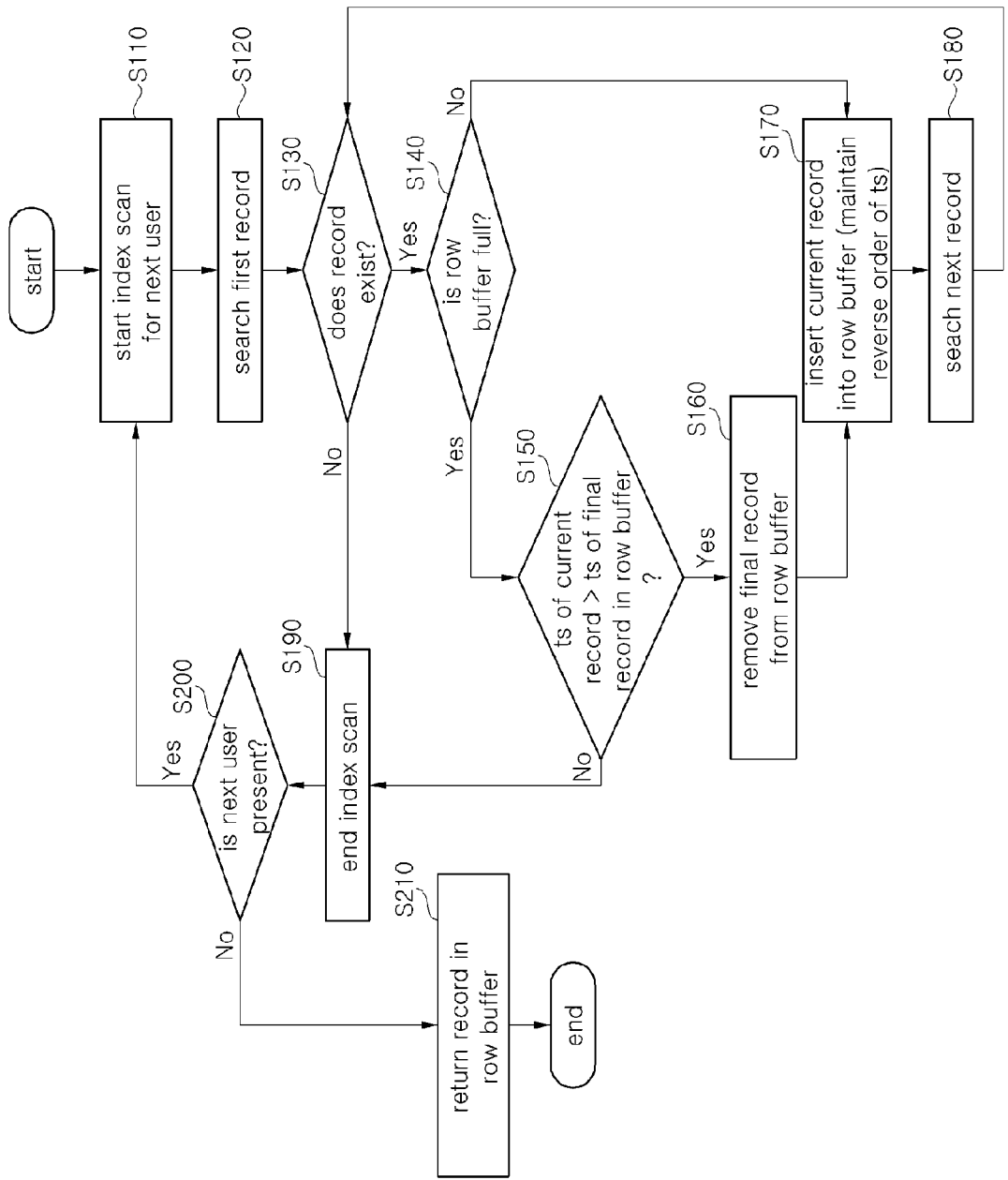
FIG. 3 is a flow chart showing a method of processing N sort queries in a multi-range scan performed a scanner according to the first exemplary embodiment of the present invention.

When all the procedures of the first exemplary embodiment of the present invention shown in FIG. 3 are performed and completed, it can be appreciated that the N records stored in the N row buffers allocated by the buffer allocator 121, which are the execution results of the N sort queries in the multi-range scan parsed by the query parsing unit 110, includes the N most recently created messages or N messages created after the specific point of time, in connection with all the messages generated by the friends of the predetermined users (the predetermined users may be included or may not be included).

Figure 4:
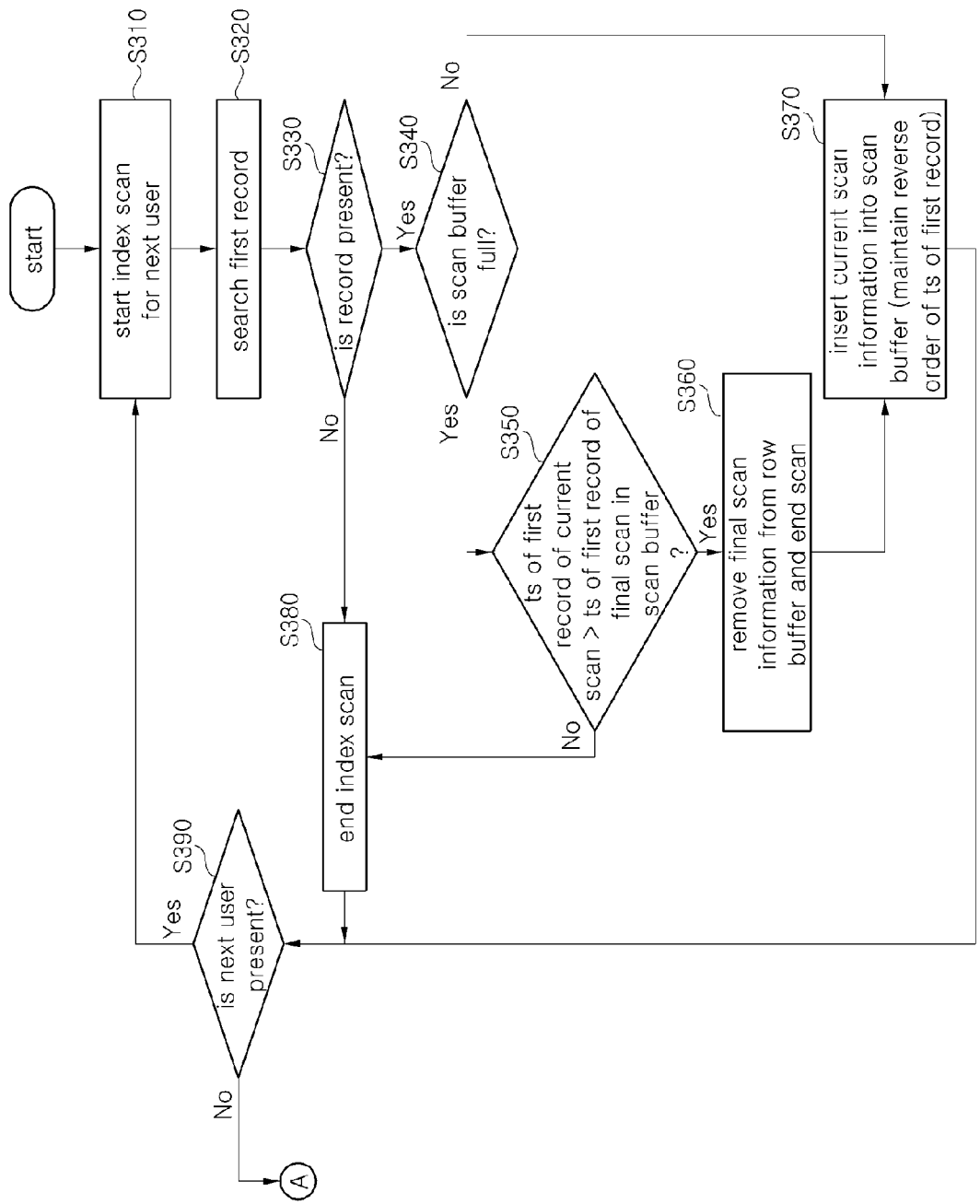
FIG. 4 and FIG. 5 are flow charts showing a method of processing N sort queries in a multi-range scan performed a scanner according to the second exemplary embodiment of the present invention.
Figure 5:
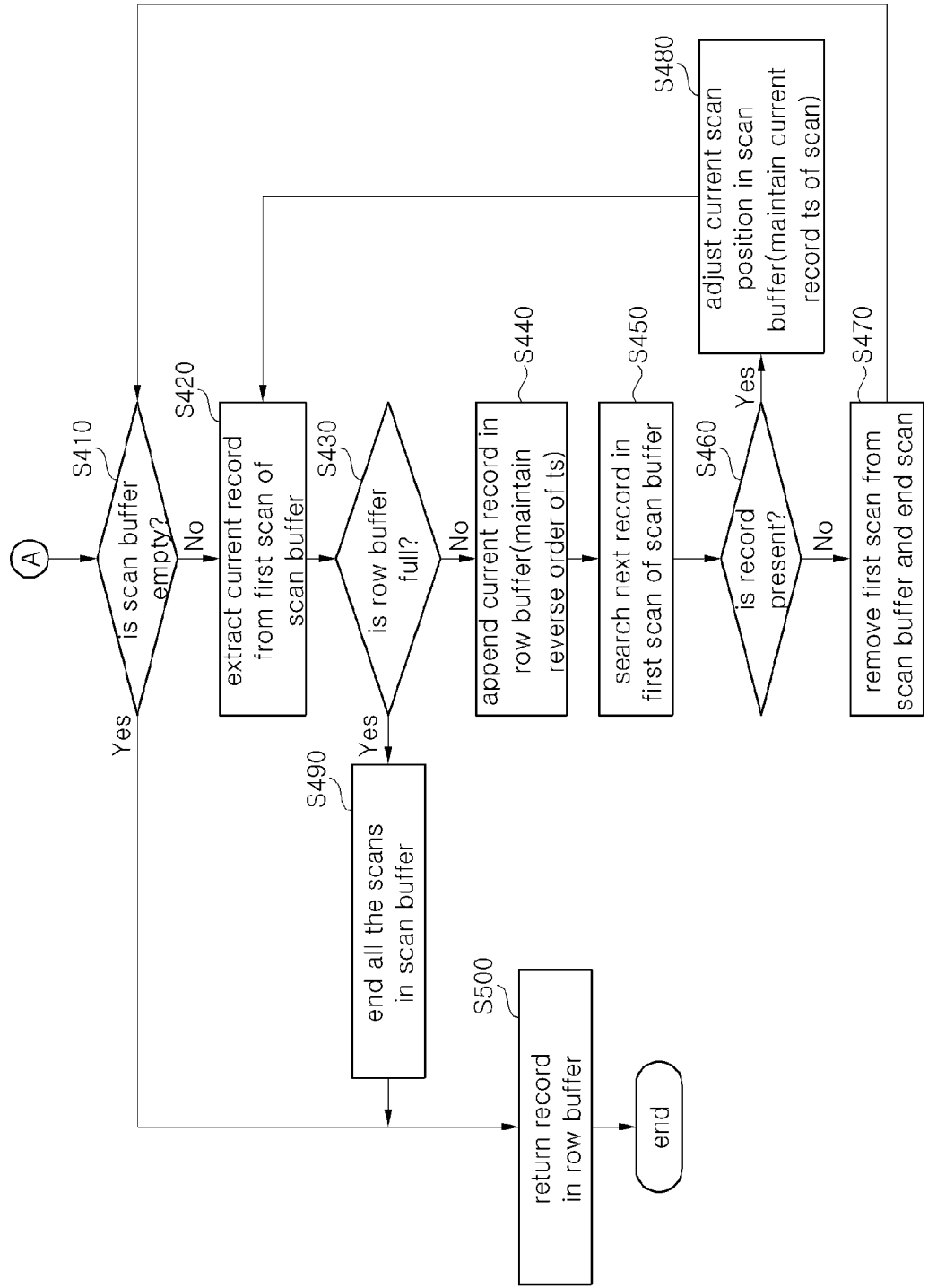

FIG. 4 and FIG. 5 are flow charts showing a procedure in which the scanner 122 according to the second exemplary embodiment of the present invention performs the N sort queries in a multi-range scan.

Before describing the second exemplary embodiment of the present invention, the technical procedure taken when the records in the specific range are searched with the index scan from the DBMS or other data repository will be described in detail. The information for accessing the table and the index to be scanned at the time of accessing the index is fetched so as to be stored in the structure that stores the index scan information and the respective index is accessed based on the information. An example of such structure is the root node identifier. Further, the range of the keys to be searched with the index and the filtering information applied to each key or record, or the like, within the range are stored. When the keys or the records within the search range are scanned therethrough, the records meeting the search conditions are searched. In addition, the positional information of the keys currently accessed in the index and the identifiers of the records having the keys are maintained. The information is first set to be NULL and is updated to the current key and the current record information every time the next record along with the first record is searched. When the index scan moves out of the scan range, an operation of ending the index scan such as returning the structure storing the scan information is performed.

Next, the scan buffer according to the second exemplary embodiment of the present invention is a buffer that stores the identifier information of the index scans indicating the records having the latest time stamps based on the time stamp of the record currently indicated by each index scan. The identifier of the index scan may be an address of the structure having the index scan information and may also be a position value at an array when the structure having the index scan information is maintained in an array form. Alternatively, the data of the actual record may be included in all the keys of the indexes without the data repository rather than the DBMS including the table concept, and the scan may also be performed only by the current key positional information of the scan. For example, at the time of starting the scan, after the positional information of the current key is set to be the root node, the positional information of the current key may be set to be the positional information of the actual key every time the first key or the next key is searched. In this case, since the size of the positional information of the key is not large, the positional information of the key may also be saved in the scan buffer. Therefore, it would be apparent to those skilled in the art that the information saved in the scan buffer may be modified according to the actual internal implementation scheme of the corresponding data repository providing the index scan function.

According to the second exemplary embodiment of the present invention, it is assumed that the buffer allocator 120 allocates the scan buffer and the row buffer corresponding to the number (hereinafter, referred to as 'N') of records to be extracted. Describing the second exemplary embodiment of the present invention with reference to FIG. 4 and the aforementioned specific record extracting procedure and the assumption situations, the scanner 122 of the query processing device 100 uses the aforementioned posts_userid_ts_index index to start the index scan for searching only the most latest messages or messages after the specific point of time for each user (S310). The index scan searches the respective index to search the first record that satisfies the search conditions (S320). If the first record that satisfies the search conditions is not present (S330), no messages generated by the current user after the specific point of time exist, and therefore, the current index scan ends (S380). If it is determined that the first record that satisfies the search conditions is present (S330), an operation of storing the current index scan information in the scan buffer is performed. To this end, first, it is checked that the scan buffer having an N size is full (S340). If it is determined that the scan buffer is not full (S340), a space to store the index scan information remains in the scan buffer, and therefore, the position at which the records are inserted in the scan buffer so as to be sorted in the reverse order of the time stamps is searched by comparing the time stamp value of the record indicated by the current index scan with the time stamp values of the records indicated by the index scans saved in the scan buffer to record the current index scan information at the corresponding position (S370). By the scheme, the index scan information stored in the scan buffer is sorted in the reverse order of the time stamps of the records indicated by each index scan. If it is determined that the scan buffer is full (S340), it is checked whether the current index scan may be inserted into the scan buffer by comparing the time stamp value of the record indicated by the current index scan with the time stamp value of the record indicated by the final index scan stored in the scan buffer, which is sorted in the reverse order of the time stamps of the records indicated by each of the index scans (S350). If it is determined that the time stamp value of the record indicated by the current index scan is smaller than or equal to the time stamp value of the record indicated by the final index scan saved in the scan buffer (S350), this indicates that the N index scans for the users created more recently than the message generated by the user that is the search object of the current index scan are previously registered in the scan buffer, such that the index scan for the current user is no longer performed. Therefore, an operation of the index scan for the current user stops (S380). If it is determined that the time stamp value of the record indicated by the current index scan is greater than the time stamp value of the record indicated by the final index scan saved in the scan buffer (S350), the scanner 122 removes the final index scan information, which is the index scan indicating the record having the oldest time stamp in the scan buffer which is sorted in the reverse order of the time stamps of the records indicated by each of the index scans and ends the scan (S360), and then, inserts the information of the current index scan into the scan buffer (S370). Even in such case, the storage order of the index scans needs to be maintained in the reverse order of the time stamps of the records indicated by the index scans in the scan buffer, and therefore, the appropriate insertion position of the current index scan is searched and inserted. If no first record to be searched in the index scan for the current user exists (S330), and if the time stamp of the first record searched by the current index scan is smaller than or equal to the minimum time stamp value of the record indicated by the final index scan saved in the scan buffer (S350), the scan does not need to be performed for the current user. Therefore, as described above, after the index scan for the current user ends (S380), it proceeds to a step of checking whether the next user is present (S390). In addition, even when the current index scan is registered in the scan buffer (S370), it proceeds to a step of checking whether the next user is present while the index scan is still being performed (S390). If it is determined that the next user is present (S390), the index scan for the user starts (S310) and thus, the aforementioned processing is repeated. If it is determined that the next user is not present (S390), the index scans appropriate to extract the N most recently created records or N records created after the specific point of time are registered in the scan buffer.

Figure 7A:
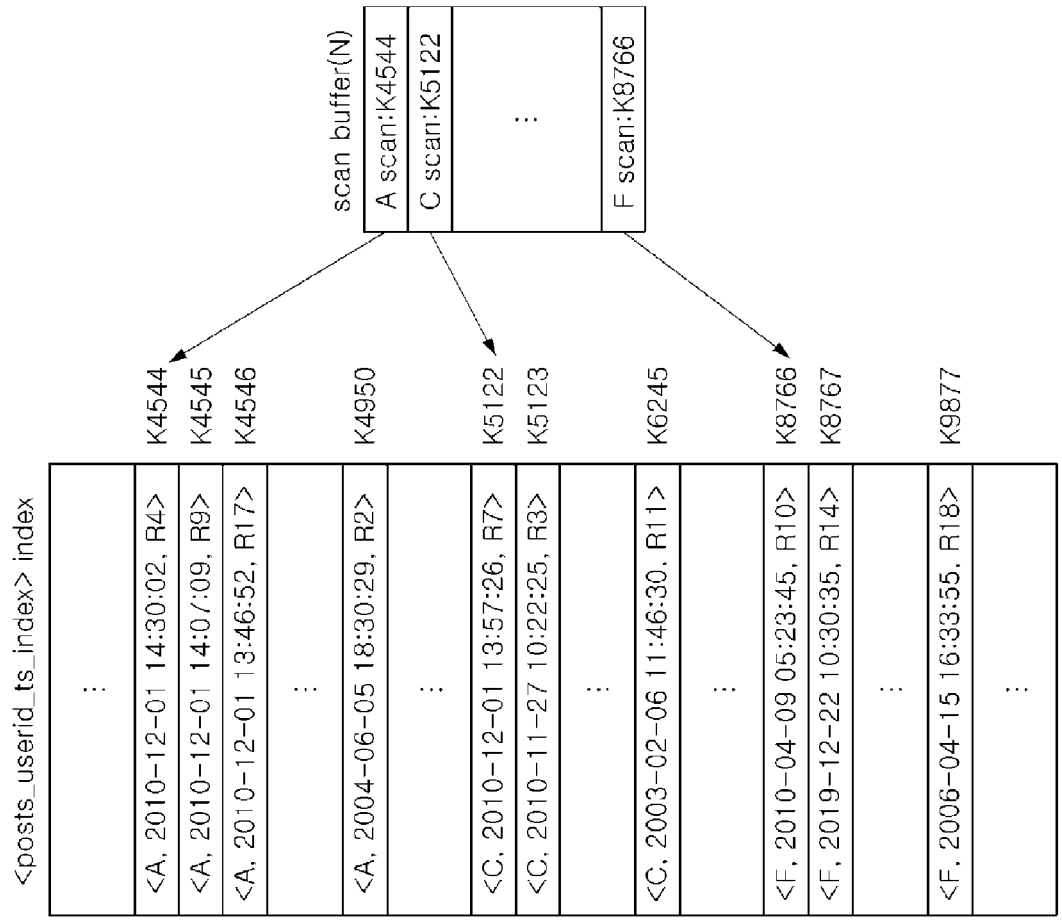

An example of the scan buffer obtained through the processes is shown in FIG. 7A. The index scan for user A stored in the right scan buffer indicates the record having the latest time stamp among the records by user A in the left posts_userid_ts_index index and the index scans for users C and F also indicate the record having the latest time stamp among the records by each user C and F. Further, the position of the index scans is ordered in the reverse order of the time stamps of the records indicated by each of the index scans.

Next, the procedure to extract only the N messages in more recent or after the specific point of time based on the index scans sorted in the reverse order of the time stamps of the indicated records and stored in the scan buffer will be described in detail with reference to FIG. 5. The scanner 122 first checks whether the index scans saved in the scan buffer exist (S410). If it is determined that the index scans exist (S410), an operation of extracting the record indicated by the first index scan, that is, the record having the latest time stamp (S420) and then, recording the records in the row buffer is performed. In this case, the index scans stored in the scan buffer are sorted in the reverse order of the time stamps of the records indicated by each of them, that is, in the latest order and therefore, at step S420, the extracted record corresponds to the record indicated by the index scan present at the head of the scan buffer. The operation is performed by first checking whether the row buffer is full (S430). If it is determined that the row buffer is not full (S430), the record is inserted into the space at the head this is empty in the row buffer (S440). Thereafter, the next record is searched in the current index scan (S450) and it is checked whether the next record is present (S460). If it is determined that the next record is not present (S460), the current index scan is removed from the scan buffer and the index scan ends (S470). Thereafter, it proceeds to a step whether the index scans remain in the scan buffer (S410). If it is determined that the next record is present (S460), the record indicated by the current index scan is changed to the next record and therefore, the position of the current index scan is readjusted based on the time stamp value of the record (S480). Even in this case, similarly, the position is readjusted in the scan buffer by a scheme of inserting the index scan information into an appropriate position so as to maintain an order of the index scans sorted in the reverse order of the time stamps of the records. When the position of the index scan is readjusted, since it is ensured that the index scan remains in the scan buffer and the index scans stored in the scan buffer are also maintained in the order sorted in the reverse order of the time stamps of the records indicated by each of them, it proceeds to a step of extracting the current record in the index scan indicating the records at the head in the scan buffer, that is, having the latest time stamp (S420) and thus, the aforementioned procedure is repeated.

According to the execution procedure, if the process of extracting the record indicated by the first index scan is repeated, the order of the extracted records also becomes an order of the latest times stamp. Therefore, when the records are inserted into the row buffer, there is no need to perform a separate binary search, another type of readjustment, or the like, for searching the position at which the records are inserted into the row buffer and when the records are filled in the row buffer by appending the records in only an empty space order from the head of the row buffer, the order of the records within the row buffer is maintained in an order sorted in the reverse order of the time stamps.

Meanwhile, when the scanner 122 extracts the record indicated by the first scan index in the scan buffer and stores the extracted record in the row buffer, if it is determined that the row buffer is full (S430), this means that all of the N records of the latest order are searched. Therefore, there is no need to perform the scan and therefore, all the index scans present in the scan buffer end (S490). Further, the N records present in the row buffer are the final results (S500) and therefore, the whole process ends.

During the execution of the aforementioned procedures, there may be a case in which the index scans are not present in the scan buffer (S410). In this case, more than 0 records exist in the row buffer in advance and the records present in the row buffer are the final result. Therefore, the scanner 122 ends the whole process. For reference, when the number of records present in the row buffer is 0, this means that there are no records satisfying the search conditions of the queries. That is, this means that the message created after the specific point of time among the messages generated by the users are not present. The result becomes a normal execution result.

FIG. 7B, FIG. 7C, and FIG. 7D shows a portion of the processes of extracting the records from the scan buffer and inserting or appending the extracted records into the row buffer according to the second exemplary embodiment of the present invention. Referring to FIG. 7B, the index scans indicating the latest records are registered in the scan buffer and the row buffer start in the empty state. The scanner 122 accesses the current keys or the current records through K4544, the positional information of the key, from scan A, the first index scan, and inserts the records into the head of the row buffer. Further, the scanner moves to K4545, the next key of scan A, and readjusts the position of scan A in the scan buffer based on the time stamp of the record indicated by the corresponding key. The time stamp value of the record indicated by K4545, the positional information of the key which is "2010-12-01 14:07:09", is newer than "2010-12-01 13:57:26" that is the time stamp of the record indicated by K5122, the positional information of the current key of scan C, the second scan, and therefore, scan A maintains the first position in the scan buffer as it is. Next, referring to FIG. 7C, in order to search the second record, as described above, the scanner 122 accesses scan A, the first index scan present in the scan buffer, to the key currently indicated through K4545 to insert the record of the key in the head that is empty in the row buffer, that is, the second position. Further, the scanner moves to K4546, the next key of scan A, and readjusts the position of scan A in the scan buffer based on the time stamp of the record indicated by the key. In this case, since the time stamp ("2010-12-01 13:46:52") of the current record of scan A is not newer than the time stamp ("2010-12-01 13:57:26") of the current record of scan C, the position of the scan buffer is readjusted so as to move scan C in the scan buffer to the head and scan A to the second position. With reference to FIG. 7D, the scanner 122 extracts the current record of scan C, the first index scan in the scan buffer, and inserts the extracted record in the row buffer and moves to the K5123, the next key of scan C, and adjusts the position in the scan buffer. Even in this case, since the time stamp ("2010-11-27 10:22:25") of the record indicated by key K5123 of scan C is not newer than the time stamp ("2010-12-01 13:46:52") of the record indicated by key 4546 of scan A, the position of the index scans stored within the scan buffer so as to be sorted in the reverse order of the time stamps indicated by each of the key is readjusted. When the process is performed N times, the N records are stored in an order of the newer time stamps.

As described above, it can be appreciated that the first exemplary embodiment and the second exemplary embodiment of the present invention have various aspects in common in their execution process, which will be described below.

First, the buffer allocator of the query execution unit allocates the buffers based on the number (for example, N) of extracted records included in the queries. In the first exemplary embodiment of the present invention, N row buffers will be allocated while in the second exemplary embodiment of the present invention, N scan buffers and N row buffers will be allocated. Next, based on the queries parsed by the parsing unit as the N sort queries in the multi-range scan for at least one record indexed and sorted in the order of the user IDs and the reverse order of the time stamps, the scanner of the query execution unit extracts the record for the single user ID, and stores the extracted record in the row buffer in the first exemplary embodiment of the present invention and stores the extracted record in the scan buffer in the second exemplary embodiment of the present invention. Thereafter, in order to satisfy the N sort queries in the multi-range scan that are the contents of the queries by comparing the time stamps with the extracted records stored in the buffer after extracting the records for the user IDs that are not extracted and then, the row buffers are updated according to the first exemplary embodiment of the present invention while the scan buffers are updated according to the second exemplary embodiment of the present invention so as to maintain the reverse order of the time stamps.

The additional execution processes unique to the first exemplary embodiment and the second exemplary embodiment of the present invention, which have been described in detail with reference to the accompanying drawings, or the like, are harmoniously combined with the common aspects of the execution process of the present invention and thus, the first exemplary embodiment and the second exemplary embodiment of the present invention may be practiced.

Compare Time Cost Between the Related Art with the Invention

When performing the uppermost N sort queries in the multi-range scan according to the first exemplary embodiment and the second exemplary embodiment of the present invention, the effect on the speed that can be obtained as compared with the related art is examined through the time cost calculated below.

First, in order to calculate the time cost of each execution scheme, the following variables are assumed.

N: The number of records to be searched
Us: The number of friends of a specific user
Kt: The number of all keys in the respective index (same as the number of all the records in the respective table)
Ku: The average number of keys for each user in the respective index (same as the average number of records for each user in the respective table)
Ks: The average number of keys to be scanned through indexes for each user in the first exemplary embodiment of the present invention In each index scan, the get_first_row operation which searches the first record satisfying the search conditions is performed one time and the get_next_row operation which searches the next record is repeatedly performed until all the records satisfying the search conditions are searched. In the index in which the number of all keys is kt, the get_first_row operation typically searches the first key satisfying the search conditions among the Kt keys by the binary search method to access the records and therefore, the cost of $\log_2(Kt)$ is consumed and the get_next_row operation directly searches the next key from the current key to access the record and therefore, 1 may be consumed as the cost.

get_first_row: $\log_2(Kt)$
get_next_row: 1

In the execution scheme according to the related art, the index scan for each of the friend users is made and therefore, the index scan is made Us times and the Ku records are extracted at the time of each index scan and are stored as the intermediate record set. Consequently, the index scan having the $\log_2(Kt)$ cost of one time and 1 cost of Ku times is performed Us times. Further, the operation of sorting the stored intermediate record set in the order of the latest time stamps is performed on the intermediate record set in which all the number of records is (Us*Ku) and therefore, the sort cost may be considered to be $(Us*Ku)*\log_2(Us*Ku)$. Therefore, the execution time cost generated depending on the execution scheme according to the related art is represented by the following Equation 1.

$$\begin{aligned}
\text{Time cost (Related Art)} &= \text{Scan Cost} + \text{Sort Cost} \\
&= (US*(\log_2(Kt)+Ku)) + \\
&\quad ((Us*Ku)*\log_2(Us*Ku)) \\
&= Us*(\log_2(Kt)+Ku+Ku*\log_2(Us*Ku)) \\
&= Us*(\log_2(Kt)+Ku*(1+\log_2(Us*Ku)))
\end{aligned}$$

Equation 1

Meanwhile, the execution scheme according to the first exemplary embodiment of the present invention also performs the index scan on each of the friend users and therefore, similarly performs the index scan Us times, extracts only the Ks records, and stores the extracted records in the order in which the extracted records are sorted in the N row buffer. That is, for searching and inserting the insertion position of the extracted Ks records in the reverse order of the time stamps in the row buffer of the N size by the binary search while having the scan cost of $(\log_2(Kt)+Ks)$, the index scan having the $(Ks*\log_2(N))$ cost is performed Us times. Therefore, the execution time cost generated depending on the execution scheme according to the first exemplary embodiment of the present invention is represented by the following Equation 2.

Time Cost (First Exemplary Embodiment)=$Us*(\log_2(Kt)+Ks+Ks*\log_2(N))=Us*(\log_2(Kt)+Ks*(1+\log_2(N)))$ Equation 2

Further, in the case of the execution scheme according to the second exemplary embodiment of the present invention, an operation of inserting the N index scan information indicating the latest records into the scan buffer is performed by performing the comparison based on the time stamp of the first record searched by the get_first_row operation while the index scan is performed Us times. Therefore, the cost of $\log_2(Kt)$ for searching the first record for each of the index scan of Us times and the cost of $\log_2(N)$ for being stored in the scan buffer is consumed and therefore, the total cost becomes $(Us*(\log_2(Kt)+\log_2(N))$. Thereafter, the records are finally included in the N row buffers in the latest order while extracting the latest records by a sort-merge scheme using the N index scans stored in the scan buffer. Specifically, the cost of extracting the current record in the first index scan in the scan buffer and including the extracted record in the row buffer consumes 1, the get_next_row execution cost for obtaining the next record of the index scan consumes 1, and the $\log_2(N)$ cost is consumed so as to re-position the index scan in the scan buffer based on the time stamp of the new current record of the index scan. Further, the operation is performed a maximum of N times and therefore, the total cost consumes $(N*(\log_2(N)+2))$. Therefore, the execution time cost generated depending on the execution scheme according to the second exemplary embodiment of the present invention is represented by the following Equation 3.

Time Cost (Second Exemplary Embodiment)=Cost consumed to store scan information in scan buffer while scanning+Cost consumed to store final record in row buffer=$(Us*(\log_2(Kt)+\log_2(N)))+(N*(\log_2(N)+2))$ The detailed value of the execution time cost calculated by Equations 1, 2, and 3 by substituting the following values into the assumed each picture is calculated by the following Table 2.

N: 20
Us: 100,000
Kt: 100,000,000
Ku: 1,000
Ks: 5

TABLE 2

|  | The Related Art | First Exemplary Embodiment | Second Exemplary Embodiment |
|---|---|---|---|
| Execution Time Cost | =100,000 * (26.58 + 1,000 * (1 + 26.58) = 2,760,658,000 | =100,000 * (26.58 + 5 * (1 + 4.32)) = 5,318,000 | =100,000 * (26.58 + 4.32) + 20 * (4.32 + 2) = 3,090,126 |
| Execution Time Rate | 100% | 0.19% | 0.11% |

As calculated through Table 2, it can be appreciated that the first exemplary embodiment of the present invention improves speed performance approximately 500 times greater than the related art and the second exemplary embodiment of the present invention improves speed performance approximately 900 times greater than the related art.

Further, describing the spatial cost used at the time of performing the queries, the related art requires a buffer that extracts and sorts the Us*Ku records as the intermediate record set. When the space in which the buffer corresponding thereto is present in the memory, the buffer is allocated using the disk rather than the memory, thereby causing the loss in the speed due to the difference in the access speed of the memory and the disk. On the other hand, according to the first exemplary embodiment of the present invention, the N row buffers are allocated and according to the second exemplary embodiment of the present invention, only the N scan buffers and the N row buffers are allocated and therefore, the spatial cost may be insignificant, as compared with the relate art.

The cost calculation is made under the situation in the general DBMS in which the keys of all the users exist in the single index. In the case of another data repository providing the index function, there may be the case in which the indexes having a small size for each user is separately created and user. In this case, the number of keys having each index becomes Ku rather than Kt and the index search cost in this case becomes $\log_2(Ku)$ rather than $\log_2(Kt)$.

The exemplary embodiments according to the present invention are implemented in a form of program commands capable of being performed through various computer components to thereby be recordable in a computer-readable recording media. The computer readable medium may include program instructions, data files, data structure, or the like, alone or a combination thereof. The program command saved in the computer-readable recording medium may be designed and constituted especially for the present invention, or may be known to those skilled in a field of computer software. Examples of the computer-readable recording medium may include a magnetic medium such as a hard disk, a floppy disk, and a magnetic tape; an optical recording medium such as a CD-ROM, a DVD; a magneto-optical medium such as a floptical disk; and a hardware device specially constituted to store and perform program commands such as a ROM, a RAM, a flash memory, or the like. Examples of the program commands may include machine language codes such as being made by compilers as well as high-level language codes capable of being executed by computers using interpreters, or the like. The hardware device may be constituted to be operated as one more software modules in order to perform the action according to the present invention, and vice versa.

Hereinabove, although the present invention is described by specific matters such as concrete components, and the like, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scopes and spirits of the invention.

What is claimed is:

1. A method that uses a processor for processing N sort queries in multi-range scan, wherein the N sort queries include a plurality of queries for extracting records and N is a natural number, the method comprising:

creating a first list by indexing a plurality of records in order according to a first attribute, and for each of said first attributes, indexing the records in order according to a second attribute;

allocating a buffer based on a first number of records intended to be extracted by the queries;

extracting, using the processor, first data including first attributes from the first list included in the queries, and storing the extracted first data in the buffer;

extracting, using the processor, second data including the first attributes from the first list other than the first attributes that were previously extracted; and updating the buffer so as to satisfy the queries by comparing data stored in the buffer with the second data, wherein the queries are N sort queries in a multi-range scan for at least one record sorted based on the first attributes and the second attributes.

2. The method of claim 1, wherein storing of the extracted first data in the buffer includes:
   extracting a smaller number of records comprising the same first attributes between the first number of extracted records and the number of records related to the first attributes; and
   storing the extracted smaller number of records in the buffer as the first data.

3. The method of claim 1, wherein the updating of the buffer includes:
   comparing the second data with data stored in the buffer to determine whether the second data satisfy a first condition, and
   in response to a determination that the second data satisfy the first condition, updating the buffer by storing the second data in the buffer, whereby the updated buffer satisfies the queries.

4. The method of claim 3, wherein the first condition is that the second attributes of the second data are newer than at least any one of the second attributes of the data stored in the buffer.

5. The method of claim 4, wherein the updating of the buffer so as to store the second data in the buffer comprises:
   deleting the records having the oldest second attributes among the data stored in the buffer from the buffer when the buffer is full; and
   inserting the second data into a specific position of the buffer so as to be sorted in an order that the second attributes of the data stored in the buffer, comprising the second data, are latest.

6. The method of claim 3, wherein the updating of the buffer is repeated by sequentially extracting the second data with the same first attribute one by one until the second data satisfy the first condition as compared with the data stored in the buffer or as long as the second data exist.

7. The method of claim 6, wherein the extracting of the second data and the updating of the buffer are repeated for all of the first attributes remaining in the first list included in the queries.

8. The method of claim 1, further comprising: determining whether the queries are the N sort queries in the multi-range scan for at least one record sorted based on the first attributes and the second attributes, wherein the allocating of the buffer, storing of the buffer, the extracting of the second data, and the updating of the buffer are performed when the queries are the N sort queries as the determination result.

9. The method of claim 1, wherein the first attributes are user IDs and the second attributes are time stamps.

10. A method that uses a processor for processing N sort queries in multi-range scan, wherein the N sort queries include a plurality of queries for extracting records and N is a natural number, the method comprising:
    allocating a buffer based on a first number of records intended to be extracted by the queries;
    extracting, using the processor, first data including first attributes of a first list included in the queries, and storing the extracted first data in the buffer;
    extracting, using the processor, second data including the first attributes of the first list other than the first attributes that were previously extracted;
    updating the buffer so as to satisfy the queries by comparing data stored in the buffer with the second data,
    wherein the queries are N sort queries in a multi-range scan for at least one record sorted based on the first attributes and second attributes;
    wherein the allocating of the buffer further allocates a second buffer based on the number of extracted records,
    wherein the buffer comprises a scan buffer to store scan information indicating the records and the second buffer comprises a row buffer to store the records, and
    further wherein the row buffer is configured to receive information indicating the records from the scan buffer.

11. The method of claim 10, wherein the updating of the buffer comprises:
    comparing the records indicated by the scan information as the second data with the records indicated by the scan information as the data stored in the buffer to determine whether the second data satisfy a second condition, and
    in response to determination that the second data satisfy the second condition, updating the buffer by storing the second data in the buffer, the updated buffer satisfying the queries.

12. The method of claim 11, wherein the second condition is that the second attributes of the records indicated by the scan information as the second data are newer than at least one of the second attributes of the records indicated by the scan information as the data stored in the buffer.

13. The method of claim 12, wherein the updating of the buffer so as to store the second data in the buffer comprises:
    deleting the scan information indicating the records having the oldest second attribute of the records indicated by the scan information as the data stored in the buffer from the buffer when the buffer is full; and
    inserting the second data into a position of the buffer in an order that the second attributes of the records indicated by the data stored in the buffer, comprising the second data, are latest.

14. The method of claim 13, wherein the extracting of the second data and the updating of the buffer are repeated for the first attributes remaining in the first list included in the queries.

15. The method of claim 14, wherein after the extracting of the second data and the updating of the buffer are repeated,
    storing, by a scanner, the records indicated by the scan information that is positioned at the head among the scan information sorted in the buffer are stored at the head of a position at which the second buffer is empty;
    moving, by the scanner, the scan information so as to indicate the next record among the records having the same attributes as the records indicated by the scan information and sorted in an order that the second attributes thereof are latest; and
    sorting, by the scanner, the buffer in an order that the second attributes of the records indicated by the scan information as the data stored in the buffer, including the moved scan information, are latest.

16. The method of claim 15, wherein storing, moving, and sorting performed after the extracting of the second data and the updating of the buffer are repeated until the second buffer is full.

17. The method of claim 10, wherein the first data are the scan information indicating a first record comprising the first attributes.

18. The method of claim 10, further comprising:
    creating a first list by indexing a plurality of records in order according to a first attribute, and for each of said first attributes, indexing the records in order according to a second attribute.

19. A non-transitory computer-readable medium comprising an executable program which, when executed, performs a method for processing N sort queries, wherein the N sort queries include a plurality of queries for extracting records, the method comprising:
- creating a first list by indexing a plurality of records in order according to a first attribute, and for each of said first attributes, indexing the records in order according to a second attribute;
- allocating a buffer based on a first number of records intended to be extracted by the queries;
- extracting first data including first attributes from the first list included in the queries, and storing the extracted first data in the buffer;
- extracting second data including first attributes from the first list other than the first attributes that were previously extracted; and
- updating the buffer so as to satisfy the queries by comparing data stored in the buffer with the second data,
- wherein the queries are N sort queries in a multi-range scan for at least one record sorted based on the first attributes and the second attributes.

20. An apparatus, including a processor, for processing N sort queries in multi-range scan of a first list, wherein the N sort queries include a plurality of queries for extracting records, and further wherein the first list is an index of the plurality of records indexed in order according to a first attribute, and for each of said first attributes, the first list is indexed in order according to a second attribute, the apparatus comprising:
- a buffer allocator to allocate a buffer based on a first number of records intended to be extracted by the queries; and
- a scanner to extract first data including first attributes of a first list included in the queries, and to store the extracted first data in the buffer, to extract second data including first of the first list other than the first attributes that were previously extracted, and to update the buffer so as to satisfy the queries by comparing data stored in the buffer with the second data,
- wherein the queries are N sort queries in a multi-range scan for at least one record sorted based on the first attributes and second attributes.

* * * * *